Figure 1:
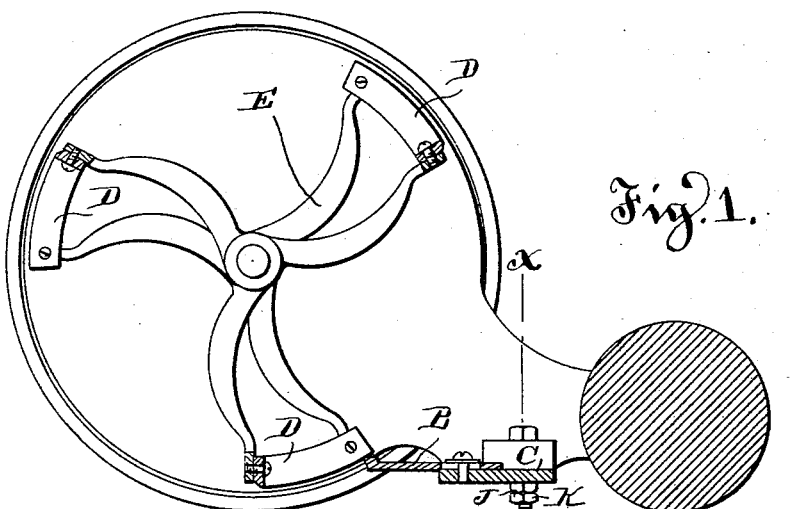

(No Model.)

H. DECK.
LAWN MOWER.

No. 570,699. Patented Nov. 3, 1896.

Witnesses:
Jesse B. Heller.

Inventor.
Henry Deck,
By
Attorney.

UNITED STATES PATENT OFFICE.

HENRY DECK, OF PHILADELPHIA, PENNSYLVANIA, ASSIGNOR TO JOHN BRAUN, WILLIAM P. M. BRAUN, AND JOHN F. BRAUN, OF SAME PLACE.

LAWN-MOWER.

SPECIFICATION forming part of Letters Patent No. 570,699, dated November 3, 1896.

Application filed January 31, 1894. Serial No. 498,568. (No model.)

*To all whom it may concern:*

Be it known that I, HENRY DECK, of the city and county of Philadelphia, and State of Pennsylvania, have invented an Improvement in Lawn-Mowers, of which the following is a specification.

My invention relates to lawn-mowers; and it consists of certain improvements which are fully set forth in the following specification and are shown in the accompanying drawings.

More particularly my invention relates to the manner of supporting the stationary cutter or ledger blade of a lawn-mowing machine, and has for its object the adjustment of the cutting edge thereof to take up wear or to bring the edge in proper relation with the rotary cutter to produce the proper cutting effects. As is well known, the cutting edge of the stationary cutter is liable to become worn away by frictional contact with the rotary cutter-blades, so that an adjustment becomes necessary. It has been proposed to adjust the rotary cutter with reference to the cutter-blade or to adjust the ledger-blade as an entirety. Such adjustments are not, however, entirely satisfactory, because the blade does not usually wear away to the same degree throughout, but becomes generally more worn at the middle than at the ends, so that an adjustment of either the cutter-bar or rotary cutter as an entirety is liable to bring the outer or less worn portions of the stationary cutter too close to the blades of the rotary cutter and to cause binding of the cutting edges at those places where the stationary blade is least worn, and even then the more worn central portion may not be in position to make proper contact. My invention is designed to overcome these difficulties by an adjustment of the stationary cutter or ledger blade in such a manner as to throw the more worn central portion of the cutting edge forward or in advance of the less worn ends, and this I accomplish by bending the blade, or the cutter-bar by which the blade is carried, by means of adjusting devices acting on the ends of the blade or bar. This adjustment of the cutter-bar or cutter by adjusting devices acting upon its ends to bend the bar may be accomplished either by the fastenings which secure the bar or cutter to the side frames or by means independent of those fastenings.

In the present application I do not claim the broad invention of adjusting the bar or cutter by means of adjusting devices acting upon its ends to bend the bar and throw the central portion forward or the specific invention of accomplishing that adjustment by means of adjusting devices independent of the fastenings, as those improvements form the subject-matter of Letters Patent No. 519,080, granted on my application May 1, 1894.

In the present application I claim the adjustment by means of the fastenings which secure the ends of the bar to the side frames.

I shall now refer to the accompanying drawings for the purpose of more particularly describing my invention.

Figure 2:
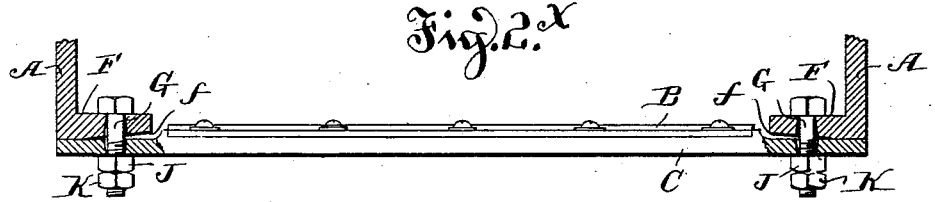
Figure 3:
Figure 4:
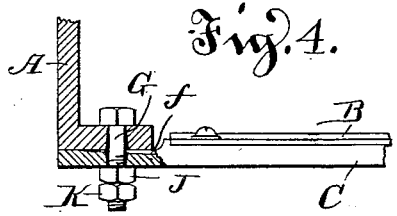
Figure 5:
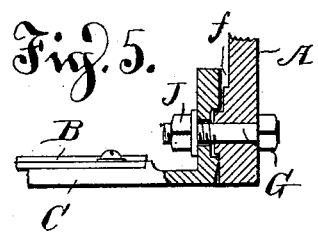

Figure 1 is a vertical sectional view of a lawn-mower embodying my invention. Fig. 2 is a side elevation of the cutter-bar with the ends and side frame shown in vertical section on the line *x x* of Fig. 1. Fig. 3 is a similar view illustrating a modification of the invention. Figs. 4 and 5 are similar views, each showing one end only and illustrating other modifications of the construction.

A are the side frames to which or to the brackets F of which the stationary cutter and its bar are secured.

B is the stationary cutter or ledger blade.

O is the cutter-blade bar.

D are the blades of the rotary cutter E.

The knife or ledger blade B and the bar C may be made in one piece, or the blade B may be separate and secured to the bar C. The latter is the usual construction employed.

G are the fastening bolts or screws by which the bar C or cutter B is secured to the side frames A or brackets F.

J are the fastening and adjusting nuts on the bolts G. Beside acting to secure the bar or cutter to the side frames, they are the means of adjusting the bar or cutter by bending it. To permit this, the adjacent faces of the frame F and the bar C are tapered or offset, as at *f*, to permit a slight movement at the ends of the bar adjacent to the bolts G. The extreme ends of the bar C bear against the adjacent faces of the frames.

It is apparent that when the nuts J on the bolts G are tightened the ends of the bar C will be drawn closer to the frames F, (this movement being permitted by the spaces $f$,) and in consequence the bar as an entirety will be sprung or bent so that the middle portion will be thrown upward, thus compensating for the wear at the middle of the cutter and causing an even cutting contact throughout the length of the cutter. The degree of this bending of the bar may of course be regulated by the adjustment of the nuts J.

K are lock-nuts on the ends of the bolts G to lock the nuts J when they have been adjusted and the bar has been bent to the proper extent.

The apertures in the bar and frames through which the bolts extend may be slightly enlarged, as shown, to permit the slight binding of the ends of the bar and to avoid the lateral strain upon the bolts.

In the modification shown in Fig. 3, instead of a bar with straight ends secured to flanged frames, I have shown a bar with flanged ends F', secured to the side frames A by the bolts G. In this construction the nuts J, when tightened, bend the flanges F' outwardly, and thus force the ends of the bar together and cause it to bend.

It is apparently immaterial whether the taper or space between the adjacent faces of the bar and frame is made by cutting away or offsetting the metal of the frames, as in Figs. 2 and 3, or by cutting away or offsetting the metal of the bar, as in Figs. 4 and 5.

I do not limit myself to the minor details of construction shown, as they may be varied without departing from the invention.

What I claim as new, and desire to secure by Letters Patent, is—

1. The combination with the side frames, of the stationary cutter-bar or cutter bearing against the side frames at its ends and having the adjacent faces of the bar and frames cut away or offset so as to permit the bar adjacent to the places at which it bears against the frames to be drawn toward the side frames, and fastening devices securing the bar to the side frames adjacent to said cut-away or offset faces provided with means for drawing the ends of the bar toward the frames and thereby causing the bar to bend and its middle portion to be thrown upward, whereby the fastening devices which secure the bar to the frame may be used to bend the bar, and the bending of the bar may be accomplished without the employment of independent or additional devices for that purpose.

2. The combination with the side frames, of the cutter-bar or cutter bearing against the side frames at its ends, the adjacent faces of the bar and frames being cut away or offset to form intermediate openings $f$, and the fastening-bolts G having adjustable nuts J whereby the ends of the bar or cutter may be drawn toward the side frames thus bending the bar and throwing the middle of the cutter upward, whereby the bar may be bent by the fastening devices without the employment of independent or additional means.

3. The combination with the side frames, of a cutter-bar or cutter having its ends fastened to the side frames with intermediate spaces between the faces of the cutter or bar and the side frames, and fastenings for securing the ends of the cutter or bar to the side frames and bending the bar to force its central portion upward to take up wear, whereby the bar may be bent by the fastening devices without the employment of independent or additional means.

4. In a lawn-mower, the combination of the side frames, the cutter-bar provided with inwardly-projecting flanged ends F', F' fastened to the side frames with an intervening space between the faces of the flanges F', F' and the side frames, the fastening devices being adapted when tightened to bend the flanges outwardly and thus bend the bar and the cutter carried by the cutter-bar.

In testimony of which invention I have hereunto set my hand.

HENRY DECK.

Witnesses:
ERNEST HOWARD HUNTER,
H. L. MOTHERWELL.